A. B. THORNTON.
Corn-Plow Fender.

No. 95,287. Patented Sept. 28, 1869.

Witnesses.

Inventor.

UNITED STATES PATENT OFFICE.

A. B. THORNTON, OF BERLIN, ILLINOIS.

IMPROVEMENT IN CORN-PLOW FENDERS.

Specification forming part of Letters Patent No. 95,287, dated September 28, 1869.

*To all whom it may concern:*

Be it known that I, ALEXANDER B. THORNTON, of Berlin, in the county of Sangamon and State of Illinois, have invented certain new and useful Improvements in Corn Plows and Cultivators; and I do hereby declare the following to be a full, clear, and exact description of the same, reference being had to the accompanying drawings, making a part of this specification, in which—

Figure 1:
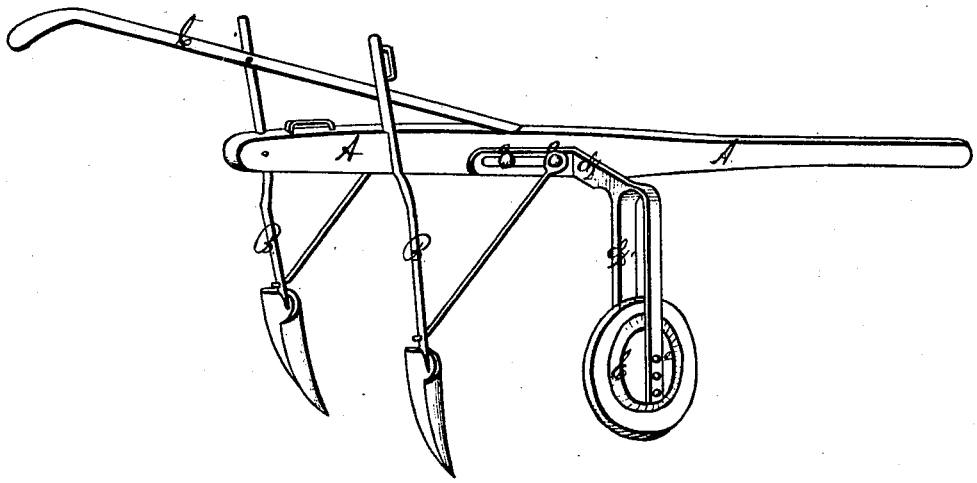
Figure 2:
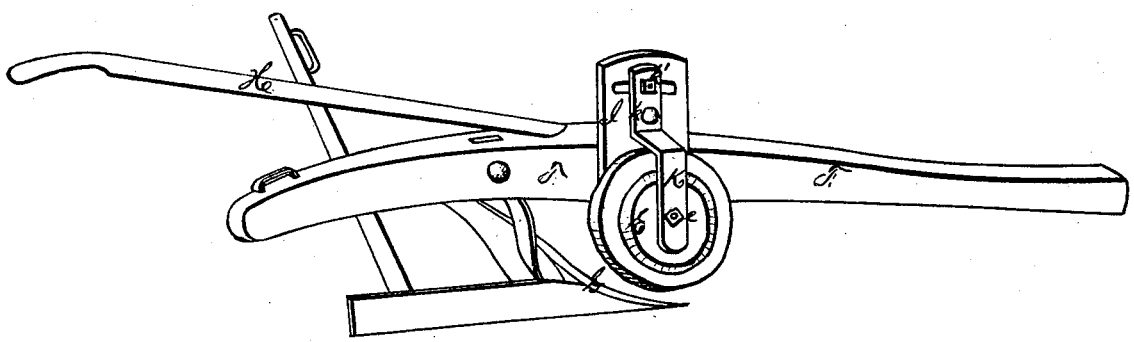

Figure 1 is a perspective view of a cultivator with my improvement attached, and Fig. 2 shows the same as applied to a plow.

Letters of like name and kind refer to like parts in each of the figures.

My invention relates to a class of devices termed "fenders," which are applied to a plow or cultivator for the purpose of warding off from the plants dirt or rubbish that might otherwise be thrown upon them by the plow; and it consists in the peculiar construction and arrangement of the fender and the devices used for securing the same to and adjusting it upon said plow, as is hereinafter fully set forth.

In the annexed drawings, A represents the draft-beam, B and B the feet, and C the handle, of a cultivator, said feet being secured to said beam and braced, and provided with shovels in the usual manner.

Secured to one side of the beam A, by means of two bolts, $a$ and $a$, is a bar of iron, D, which extends outward at a right angle with said beam, and is connected to and forms a part of a vertical fork, D'.

E represents a wheel pivoted upon a bolt, $e$, passing horizontally through the fork D', its axis being at a right angle to the line of draft and rendered adjustable vertically by means of a series of holes, $d$ $d$, within said forked standard, which corresponds in size with said axial bolt.

The object of this device is twofold: first, as the wheel E precedes the shovels and rolls upon the surface of the ground, it will be evident that its position vertically with reference to said shovels will determine the depth to which they shall go beneath the surface of said ground; second, if placed at a suitable distance in front of the shovel upon the same side of the beam, all dirt or rubbish thrown outward by said shovel will be received by said wheel and prevented from covering or in any manner injuring the plants.

In Fig. 2 is seen a plow of ordinary construction, consisting of the draft-beam F, share G, and handle H, to the landward side of which my device is attached. In this case the fender having to sustain a greater strain, and also being required much nearer the beam, the forked standard only is employed, which standard is composed of a plate, I, secured to said beam by means of one or more bolts passing through both, and of an angular brace, K, pivoted at $k$ to said plate and secured thereto at its upper and lower ends by bolts $k'$ and $k''$, the latter of which serves as an axis for the roller or fender E. The hole in the plates I, through which the bolts $k'$ and $k''$ pass, are slotted, so as to allow of the "fore-and-aft" adjustment of the lower end of the brace K, and consequently of the roller A, while a vertical slot in said plate, through which pass the bolts attaching it to the beam, permits of the vertical adjustment of the whole device.

The operation of the fender, when applied to the plow, is the same as hereinbefore described, and its advantages will be readily seen.

That the fender is not in itself new I am well aware, but believe that the devices for attaching it to the plow or cultivator and rendering it adjustable thereon have never before been known, and that they possess great advantages over any in use in point of simplicity, convenience, and cheapness.

Having thus fully set forth the nature and merits of my invention, what I claim as new, and desire to secure by Letters Patent, is—

The fender E when constructed as described, in combination with the slotted standards D and D', or its equivalent, I and K, (shown in Fig. 2,) substantially as and for the purpose specified.

A. B. THORNTON.

Witnesses:
 GEO. O. MARCY,
 JOHN H. CHERRY.